Sept. 16, 1930.  H. CLEMENT  1,775,987
OPTICAL TESTING APPARATUS AND METHOD
Filed Dec. 7, 1926   2 Sheets-Sheet 1

Inventor
Hans Clement
By his Attorneys
Stockbridge & Borst

Sept. 16, 1930. H. CLEMENT 1,775,987
OPTICAL TESTING APPARATUS AND METHOD
Filed Dec. 7, 1926 2 Sheets-Sheet 2
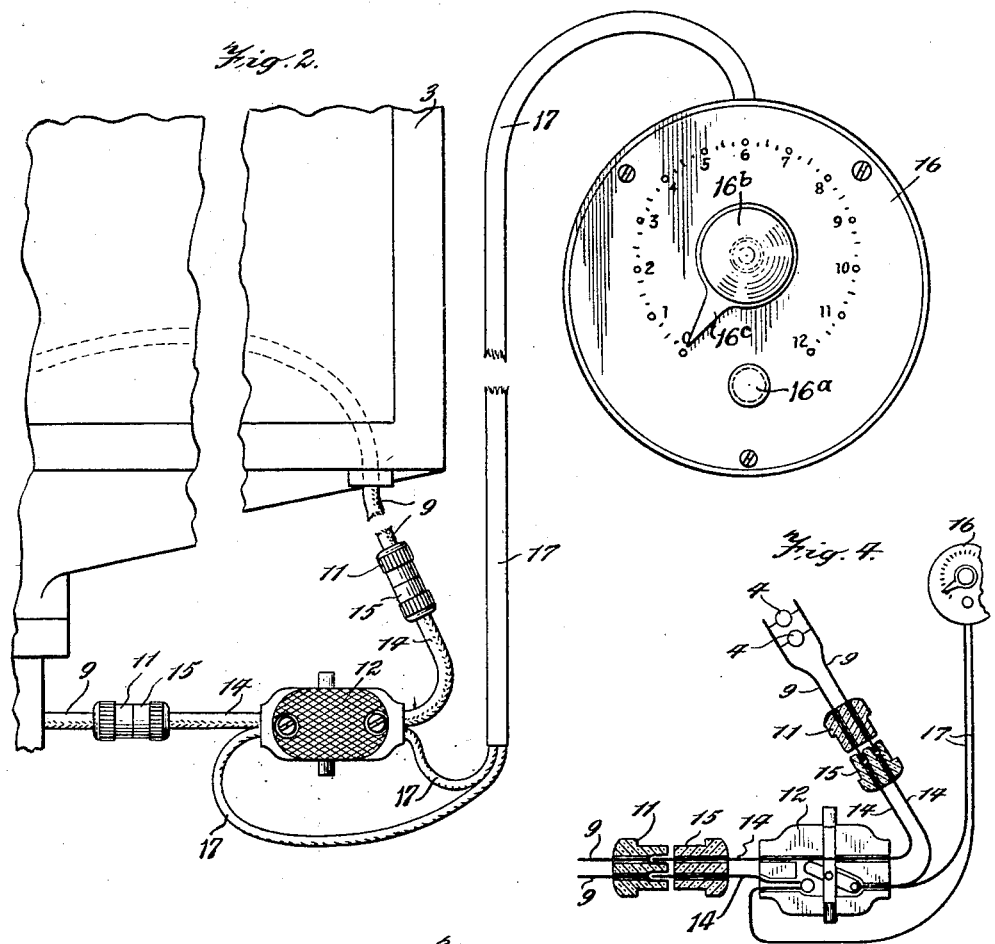
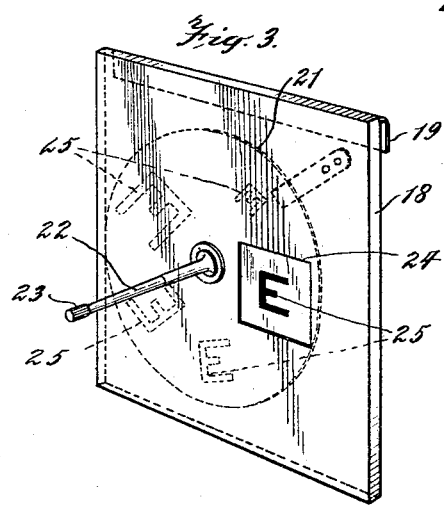
Inventor
Hans Clement
By his Attorneys
Stockbridge + Borst Patented Sept. 16, 1930

1,775,987

UNITED STATES PATENT OFFICE

HANS CLEMENT, OF NEW YORK, N. Y., ASSIGNOR TO GENERAL OPTICAL COMPANY, INC., A CORPORATION OF NEW YORK

OPTICAL-TESTING APPARATUS AND METHOD

Application filed December 7, 1926. Serial No. 153,080.

In the testing of eyes, there are many instances where it is desirable that the patient's acuity of vision or ability to see clearly be further determined by inspection of test charts under illumination continued only for brief periods of time. This test indicates the rapidity with which the subject is able to see and perceive outlines, and is a further measure not only of his acuity of vision but more particularly also of his rapidity of perception or speed of vision. This is of particular importance in the case of individuals who are engaged in such occupations as the driving of automobiles and like activities where prompt and accurate response is required to briefly occurring visual stimuli. If the person cannot see both clearly and quickly, obviously he cannot make the proper response; and if his vision does have both acuteness and speed of perception, he must also be able quickly to translate the visual stimuli into muscular reflex actions, as a matter of safety to himself and others.

In the past there has been no satisfactory convenient device available for the rapid routine testing of this particular visual property of speed of perception. Objects of this invention are to provide an improved method and apparatus whereby such tests may be made more quickly and accurately.

The device of my invention provides a simple attachment, cooperating with a standard optical test chart apparatus for the performance of this test, for accurately determining speed of vision per se, and more particularly in connection with and in relation to acuity in general, as well as also the promptness of muscular response. Such device consists of a special test chart adapted to be illuminated by the usual test chart lights, and an interval timer adapted to cooperate with the test chart lights for the illumination of the test chart for a controlled brief interval.

Thus this invention provides an improved method and apparatus whereby tests of the rapidity of visual perception are conveniently and easily made in the course of routine optical testing of a subject's eyes.

Other objects and advantages of the invention, together with various features of construction and combinations of parts employed in the carrying out of the invention, will be apparent from the following description when read in connection with the accompanying drawings, wherein:

Fig. 2 is a larger view of the interval timer and its connections to the test chart of the system of my invention;

Fig. 3 is a perspective view in front elevation of the special test chart of the system of my invention, and Fig. 4 is a diagram of the electric circuits of the device of my invention.

Figure 1:
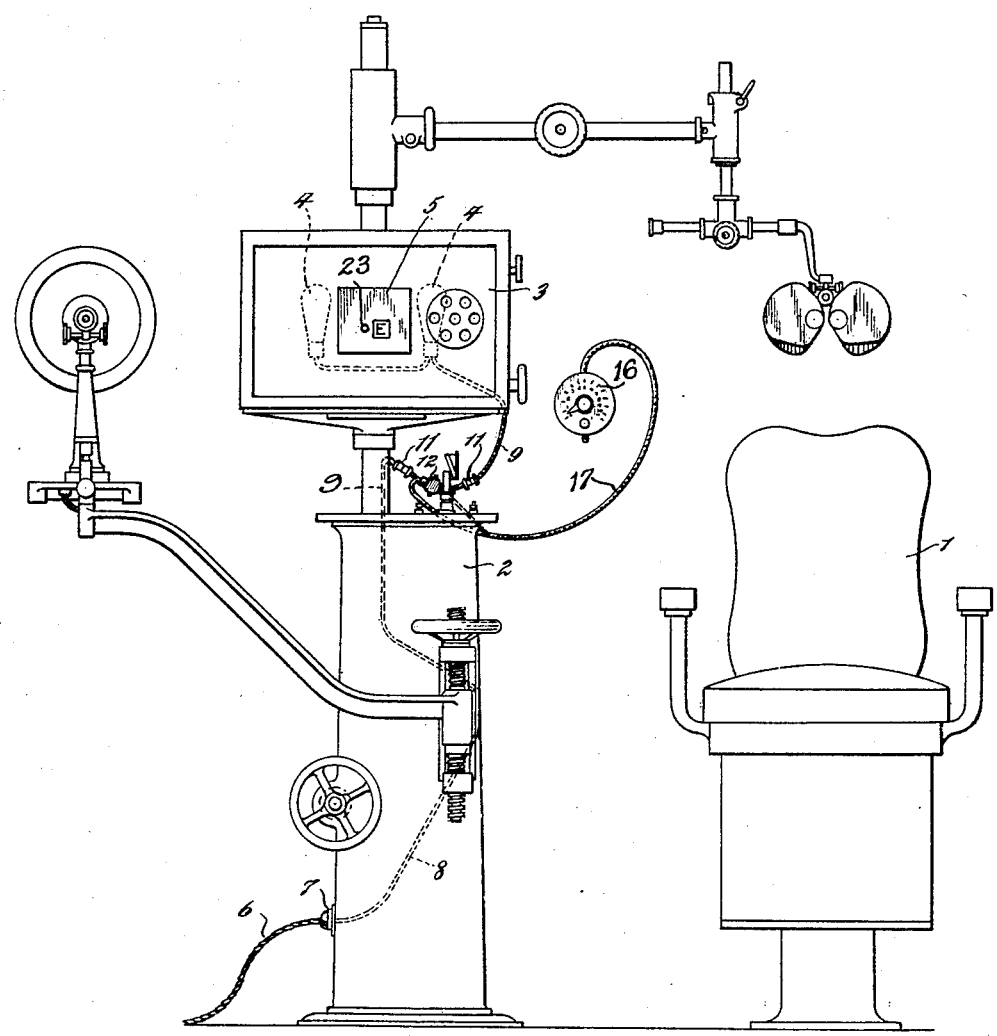
Fig. 1 is a front view of an apparatus embodying the system of my invention.

Referring to Fig. 1, I provide a chair 1 in which the subject may be seated, and an ophthalmic test device comprising a base portion 2, a chart cabinet 3, and testing apparatus combined therewith for routine optical testing as disclosed in the copending application, which became Patent No. 1,625,075, April 19, 1927. As disclosed therein, I provide a test cabinet, indicated at 3 in Fig. 1, which comprises a cabinet portion and changeable charts as disclosed in further detail in the copending application, which became Patent No. 1,692,929, dated November 27, 1928. The test cabinet 3 contains a pair of electric lamps 4 adapted to illuminate the test charts 5 therein. Electric current for energizing the lights 4 is supplied from a convenient power source through the wires 6 to a socket 7 in the stand 2 and through wires 8 in the stand 2, and wires 9 between the stand and the test cabinet. The wires 9 are provided with a separable connector 11 whereby the circuit may conveniently be broken for the insertion of other devices.

I further provide a switch 12 which may be of the "through type" having wires 14 connected thereto with separable connector members 15 on the ends thereof, similar to the separable connectors 11, and adapted to cooperate therewith. The switch 12 operates to open or close the circuit through one of the wires passing therethrough as shown in Fig. 4.

I further provide an interval-timer circuit-closing switch 16 which may be of any convenient pattern and which operates upon the pressure of a button 16$^a$ to close the switch for a predetermined short time. The length of this time interval may be adjusted by turning a controlling knob 16$^b$, and will be indicated by a pointer 16$^c$, which cooperates with graduated indicia on the front face plate of the timer 16. At the end of the selected time interval, the timer mechanism automatically breaks the circuit, which then will remain open. The interval timer 16 is connected by wires 17 to the contacts of the switch 12 as shown in Fig. 4.

The interval timer 16 may take any desired form, which is adapted to close an electric circuit for a brief, determined, interval of time. Almost any of the timer switches adapted to X-ray work are adaptable for this purpose but it is desirable that a reasonably high accuracy of timing be obtained. There are various patterns of suitable switches available, a preferred one of which is adapted to close an electric circuit for periods of time ranging from one-eighth of a second to twelve seconds, which is about the range of time required for the device of my invention.

I further provide an auxiliary test chart as shown in Fig. 3, comprising a frame portion 18 having an edge turned over to form a hook 19, which is adapted to cooperate with the charts in the test cabinet 3, to support the auxiliary test chart in a suitable position with respect to the lamps 4. Within the frame 18 is positioned a disc 21 having an axis shaft 22 and finger knob 23. An opening 24 is provided in the front of the frame 18 and a plurality of characters 25 which may desirably be of different sizes, are provided upon the face of the disc 21, and adapted to be brought successively into register with the opening 24, for inspection by a subject.

In the operation of my invention the separable connector 11 in the supply wires 9 to the chart cabinet 3 may be pulled apart and the separable connectors 15 inserted, cooperating with the members of the connector 11. The switch 12 may then be closed and other control switches in the supporting column 2, (not shown) closed to light the lamps 4. The usual routine refractive tests may then be made upon the eyes of a subject seated in the chair 1 in the usual fashion. This is a necessary preliminary or initial precautionary measure, for a part of the complete test, since speed of perception cannot be accurately tested until refractive errors, if any, have been corrected. At the close of these usual tests, or it may be at some other time as desired, the test for speed of perception, and acuity in connection therewith, may be made by introducing the auxiliary test chart 18 into the cabinet 3 through the front sight opening described in the previously mentioned Patent No. 1,692,929. A convenient test character may be positioned before the opening 24 in the auxiliary chart frame 18 and the lights 4 may be extinguished by opening the switch 12.

The interval timer 16 is then adjusted for a small interval value, preferably a fraction of a second, and given to the subject, who is instructed to look into the opening in the chart cabinet and then press and hold down the button 16$^a$ on the interval timer. Upon actuation of the timer, the chart is illuminated for the brief predetermined time, the lighting circuit then being automatically opened by the timer, and the subject has only this brief interval in which to observe the test figure, since the lighting circuit remains open. The first interval is desirably chosen too short to permit of correct perception by even the most rapid observer, and succeeding inspections are then made with the timer set, by means of its controlling knob 16$^b$, at progressively longer intervals until the subject is able to perceive correctly the test figure on the chart. The length of the illumination period, as indicated by the timer, is then a measure of his speed of perception, and it thus becomes possible to determine the relative speed of perception of various subjects. Also, as will be clear to those skilled in the art, a wide variety of tests may be made, conducted in various ways.

The test for speed of perception may desirably be performed in the course of the usual routine tests for refractive correction, and the refractive tests are desirably made first, in order to measure the patient's acuity of vision, by means of the usual type of test charts. These charts are however less satisfactory for the determination of the speed of perception, partly because of the fact that the patient may have memorized some of the characters and also because of the fact that the standard charts may contain an undesirably large number of characters and an undue range of character size. Accordingly the speed of perception tests are desirably made with the use of a special auxiliary test chart, which may desirably take the form shown, with a single character, or may take other suitable forms, better adapted than the standard test charts to the speed of perception tests.

A number of characters of different sizes are provided upon the face of the chart as indicated and various individual characters may be employed, chosen according to the other indications, which may be the refractive tests, of the amount of refractive error. It is of course obvious that if a small character is used and the subject has serious refractive errors in his vision, he may be unable to recognize the character under any conditions of illumination, no matter how long continued, while on the other hand if his vision is substantially free from refractive errors, and his speed of perception is high, the time required to identify a large character may be less than is conveniently measurable.

A series of determinations may thus be made upon a group of individuals and the average speed of perception determined, both with complete refractive correction, and with varying degree of incomplete correction. With such an average value determined, it is possible to distinguish those individuals whose speed of perception is much below the average. These are the individuals who may not see rapidly enough to perform proper movements to prevent error or danger, as for instance, in the operation of an automobile or other transportation device, or in the operation of dangerous machinery. These subjects may be warned accordingly and thereby the life and safety of both themselves and others safeguarded.

By the device of my invention I have produced a convenient, simple means for the routine determination of the speed of visual perception of a subject.

While I have shown and described but a single embodiment of the device of my invention in the accompanying drawings and description, it is capable of various modifications without departing from the spirit thereof, and it is desired, therefore, that only such limitations shall be imposed thereon as are required by the prior art or indicated by the appended claims.

I claim as my invention:

1. An optical test device comprising a test chart housing, a plurality of test charts adapted to refractive tests, an auxiliary test chart adapted to speed of perception tests, illuminating means, an interval timer, and means comprising a switch for inserting said timer in circuit with said illuminating means.

2. An optical test device comprising a test chart housing, a plurality of test charts adapted to refractive tests, an auxiliary test chart adapted to speed of perception tests, illuminating means, an interval timer having a switch and means comprising a time delay system, an associated controlling knob, and a starting button for closing said switch for a predetermined time, and means comprising a removable switch system for inserting said timer in circuit with said illuminating means.

3. An optical test device comprising a cooperating stand and test chart cabinet, a plurality of test charts therein, an auxiliary test chart comprising a frame, a rotatable disc therein, a finger grip for rotating said disc, a plurality of test figures on said disc, means comprising an opening in said frame for viewing said test figures independently, and means comprising a source of illumination and an interval timer for illuminating said auxiliary test chart over brief predetermined periods.

4. An optical test device comprising a cooperating stand and test chart cabinet, electric control and supply means in said stand and electric connections to said cabinet, electric lights in said cabinet associated with said supply means, means comprising separable connector plugs and a switch adapted to insertion in said electric circuits, means comprising an interval timer having a switch and lead wires associated with said timer switch for closing said circuit for predetermined intervals of time, and an auxiliary test chart cooperating with said cabinet and said electric lights.

5. In combination, a test chart housing, test charts, electric chart-illuminating means in the housing, an automatically acting interval timer, and means comprising a switch for inserting said timer in circuit with said illuminating means for the time controlled illumination of said charts, the said interval timer being of the type which after a predetermined interval of time opens a closed circuit and leaves it open.

6. In combination, a test chart holder, test charts cooperating therewith, means comprising an electric light for illumination thereof, an automatically acting interval timer switch, and switch means for associating said interval timer switch with said light for the control thereof, the said timer switch including manually operable circuit-closing means, and automatically operating circuit-opening means which leave the circuit open until the said circuit-closing means is again manually operated.

7. The method of testing the speed of visual perception which consists in measuring the refractive error of a subject's eyes providing any required correction to obtain clear vision, adjusting a suitable test chart in accordance with the degree of refractive correction, illuminating the chart for a predetermined brief interval, changing such interval of illumination, and determining the shortest interval of time of illumination in which the chart can be accurately perceived.

8. The method of testing the speed of visual perception which consists in first determining the degree of optical correction of the eye under test, making such correction, presenting a test chart having characters of a type and size chosen in accordance with the degree of optical correction, illuminating the presented test chart for a series of predetermined progressively increasing time intervals, and determining the shortest time interval in which the said characters of the test chart are correctly perceived.

9. The method of testing the speed of visual perception which consists in first determining the degree of optical correction of the eye under test, making such correction, presenting a test chart having characters of a type and size chosen in accordance with the degree of optical correction, illuminating the presented test chart for a series of predetermined progressively increasing time intervals, determining the shortest time interval in which the said characters of the test chart are correctly perceived, and comparing the perception time thus obtained of various subjects which have been subjected to such test thereby to determine the relative degree of speed with which they correctly perceive objects.

10. The method of testing the speed of visual perception which consists in electrically illuminating a test chart, controlling the electric lighting circuit in such a manner as thereby to illuminate the said chart for a series of progressively varying short time intervals, and noting the shortest time interval in which the test chart can be correctly perceived.

11. In combination, a test chart, an electric lamp arranged to illuminate the test chart, an automatically acting interval timer switch in circuit with said lamp, and manually operable means for closing the circuit through the said lamp and timer switch, the said timer switch including means for automatically opening such closed circuit after a predetermined interval of time and for thereafter leaving such circuit open.

12. In combination, a test chart, an electric lamp arranged to illuminate the test chart, an automatically acting interval timer switch in circuit with said lamp, and manually operable means for closing the circuit through the said lamp and timer switch, the said timer switch including means for automatically opening such closed circuit after a predetermined interval of time and for thereafter leaving such circuit open, and the said timer switch also including manually operable controlling means for adjustably varying the interval of time during which the said circuit will remain closed before it is automatically opened by the said automatically acting means.

In witness whereof, I hereunto subscribe my signature.

HANS CLEMENT.